(12) United States Patent
Michel et al.

(10) Patent No.: US 9,167,539 B2
(45) Date of Patent: Oct. 20, 2015

(54) METHOD FOR ADAPTING A DOWNLINK TRANSMIT POWER OF A FIRST BASE STATION ADAPTED FOR SERVING A CLOSED SUBSCRIBER GROUP IN THE PRESENCE OF SECOND BASE STATION

(75) Inventors: Juergen Michel, Munich (DE); Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 13/144,001

(22) PCT Filed: Jan. 12, 2009

(86) PCT No.: PCT/EP2009/050271
§ 371 (c)(1),
(2), (4) Date: Jul. 11, 2011

(87) PCT Pub. No.: WO2010/078969
PCT Pub. Date: Jul. 15, 2010

(65) Prior Publication Data
US 2011/0274072 A1    Nov. 10, 2011

(51) Int. Cl.
*H04W 52/04* (2009.01)
*H04W 52/24* (2009.01)
*H04W 36/00* (2009.01)

(52) U.S. Cl.
CPC .......... *H04W 52/245* (2013.01); *H04W 36/00* (2013.01); *H04W 52/243* (2013.01)

(58) Field of Classification Search
CPC .. H04W 36/00; H04W 36/0083; H04W 36/38
See application file for complete search history.

(56) References Cited

U.S. PATENT DOCUMENTS 6,256,486 B1 * 7/2001 Barany et al. .................. 455/296
2007/0254612 A1 * 11/2007 Simmons et al. ........... 455/161.1
2008/0130593 A1 * 6/2008 Scheinert et al. ............. 370/337
2008/0188265 A1 * 8/2008 Carter et al. .................. 455/561
2011/0151886 A1 * 6/2011 Grayson et al. ............ 455/452.1

OTHER PUBLICATIONS

R4-071540, "LTE Home Node B Downlink Simulation Results with Flexible Home Node B Power", Nokia Siemens Networks, TSG-RAN Working Group 4 (Radio) Meeting #44bis, Shanghai, China, Oct. 8-12, 2007, 6 pgs.
R4-080409, "Simple Models for Home Node B Interference Analysis", Qualcomm Europe, 3GPP TSG-RAN Working Group 4 (Radio) Meeting #46, Sorrento, Italy, Feb. 11-15, 2008, 13 pgs.
3GPP TR 25.820, V8.2.0 (Sep. 2008), "$3^{rd}$ Generation Partnership Project; Technical Specification Group Radio Access Networks; 3G Home Node B Study Item Technical Report (Release 8)", 40 pgs.
3GPP TR 25.9xx, 1.0.0 (Nov. 2008), "$3^{rd}$ Generation Partnership Project; Technical Specification Group Radio Access Networks; FDD Home Node B RF Requirements Work Item Technical Report (Release 8)", 41 pgs.

* cited by examiner

*Primary Examiner* — John Blanton
(74) *Attorney, Agent, or Firm* — Harrington & Smith

(57) ABSTRACT

Method for adapting a downlink transmit power of a first base station adapted for serving a closed subscriber group. It is described a method for adapting a downlink transmit power of a first base station adapted for serving a closed subscriber group. The method includes scanning a neighborhood of the first base station for a second base station adapted for serving an open subscriber group, wherein the first base station and the second base station use the same carrier frequency, detecting whether the second base station is present within the neighborhood of the first base station, and adapting the downlink transmit power of the first base station depending on the presence of the second base station. It is further described a base station, a computer-readable medium and a program element for carrying out the method.

17 Claims, 2 Drawing Sheets

METHOD FOR ADAPTING A DOWNLINK TRANSMIT POWER OF A FIRST BASE STATION ADAPTED FOR SERVING A CLOSED SUBSCRIBER GROUP IN THE PRESENCE OF SECOND BASE STATION

FIELD OF INVENTION

The present invention relates to the field of wireless communication networks. In particular, the invention relates to a method for adapting a downlink transmitter power of a first base station adapted for serving a closed subscriber group. Further, the invention relates to a base station, a computer-readable medium and a program element, which are adapted for performing the above mentioned method.

ART BACKGROUND

A typical mobile communication network comprises one or more base stations. In particular, such a mobile communication network may be a UMTS, a 3GPP Long-Term-Evolution (LTE) or 3GPP Long-Term-Evolution-Advanced network (LTE-A). The base stations may be a NodeB (NB) or enhanced NodeB (eNodeB, eNB), especially a Home NB or Home eNB (H(e)NB). Low transmission power base stations may have access restrictions. The 3GPP therefore has specified the closed subscriber group (CSG) services for example using home base stations H(e)NBs or for deploying enterprise networks, for example office solution formed from multiple pico base stations. A CSG is a private base station or a private network (multiple base stations) providing services to only a closed subscriber group (CSG) of users.

Compared to conventional eNBs for HeNB an important additional feature is the ability to select and indicate eNB access type by physical layer configuration. The two standardized types of cells are open (normal) ones (OSG, Open Subscriber Group) and CSG (Closed Subscriber Group) ones and the access types are called open and closed. According to 3GPP specification physical layer notification can be done by selecting physical cell IDs defined for open or closed access and to signal on the BCCH (broadcast control channel) of a wide area cell which physical cell IDs indicate open and which physical cell IDs indicate closed access. In an open subscriber group (OSG) scenario, any terminal or subscriber is served by the OSG node (for example eNB) and in a closed subscriber group (CSG) scenario, the CSG node, for example HeNB, serves only a limited number of terminals, which may be only subscribers that are allowed to access the given CSG node.

If the CSG network is operated at the same carrier frequency as an OSG or non CSG network, interference from CSG nodes to OSG nodes may arise. With CSG enabled for example the access of visiting user equipment to a HeNB or a pico NB is prevented. However on the other hand wide area dead zones are caused by the downlink interference from the CSG nodes, for example HeNB, which makes it impossible to the visiting user equipment to access neighboring OSG nodes, for example wide area networks, when visiting macro user equipments (UEs) are located close to a CSG HeNB or pico NB.

There may be a need for providing a reliable and computational inexpensive method for adapting a downlink transmitting power of a first base station adapted for serving a closed subscriber group, which reduces interferences between base stations.

SUMMARY OF THE INVENTION

This need may be met by the subject matter according to the independent claims. Advantageous embodiments of the present invention are described by the dependent claims.

According to a first aspect of the invention there is provided a method for adapting a downlink transmit power of a first base station adapted for serving a closed subscriber group. The method comprises scanning a neighborhood of the first base station for a second base station adapted for serving an open subscriber group, wherein the first base station and the second base station use the same carrier frequency, detecting whether the second base station is present within the neighborhood of the first base station, and adapting the downlink transmit power of the first base station depending on the presence of the second base station.

This aspect of the invention is based on the idea that interferences may be avoided by an adaptation of the downlink transmit power of the first base station adapted for serving a closed subscriber group. As already discussed, if the CSG network is operated at the same carrier frequency as an OSG or non CSG network, interference from CSG nodes to OSG nodes may arise. Conventional solutions for this problem may be utilizing different RAT (Radio Access Technologies) as a fallback in so called dead zones, using decreased HeNB power to reduce the dead zones or using different frequencies for macro and HeNB networks if available. However, all these solutions have drawbacks.

Further, for using decreased HeNB power to reduce dead zones, the HeNB should be aware of the received transmit power strength of neighbor wide area eNBs and/or overlay eNBs, which are non CSG neighbor eNBs, to do reasonable power setting. When utilizing a different RAT, it may not always be clear whether there are different RATs available and whether there are roaming agreements among the operators.

For utilizing different frequencies, operators may not have duplicate frequency bands and simply may have to use the same spectrum for HeNB as for the wide area network. Regarding using decreased HeNB power, with the reduction of HeNB transmission power the achievable performance of the home network may suffer. Therefore, in the present invention, the power adaptation or reduction may be done adaptively for example dependent on the received transmit power from neighboring eNBs.

Summarizing the main problem in hierarchical network deployments with co-channel scenario is during downlink the feature of closed subscriber groups (CSG). If wide area (WA) OSG and local area (LA) CSG networks are deployed in the same frequency band (co-channel deployment) interference experienced by WA UEs coming from the LA CSG is significantly higher than in non CSG deployments where WA UEs can connect to LA OSG nodes.

In the present invention, these problems are avoided by the following method. A first base station or NodeB, especially a Home enhanced NodeB (HeNB) may scan its neighborhood for a second base station or NodeB, wherein the first base station and the second base station use the same carrier frequency eventually generating interferences or dead zones of the wide area network of the second base station. It may then be detected whether the second base station is present and/or active within the neighborhood of the first base station. Subsequently, the downlink transmit power of the first base station may be adapted depending on the presence of the second base station. The adaptation may be increasing of the transmit power or decreasing the transmit power.

The invention may not be limited to HeNBs but may be applied for general small nodes like pico eNBs with local services and CSG feature as well. The invention may be applicable for LTE FDD and may be adopted to other OFDMA FDD based mobile communication systems other than LTE. The solution given here may be mainly a solution in the radio access network (RAN).

In the following there will be described exemplary embodiments of the present invention.

According to an embodiment of the invention, the downlink transmit power of the first base station is adapted according to predefined rules.

These rules may be provided centralized or defined by the operator of the first base station. The rules may be dependent on several parameters.

According to a further embodiment, scanning a neighborhood of the first base station comprises a plurality of individual scanning procedures for the second base station.

The HeNBs, which may be the first base station, and probably also other small access nodes like pico eNBs are movable devices. Therefore, periodic measurement of neighbor environment may be needed for these access nodes with CSG feature to allow adaptive downlink power setting, as the neighborhood may be changing.

According to a further embodiment of the invention, scanning a neighborhood of the first base station is carried out during idle periods of the first base station.

Idle periods may denote periods where a base station is allowed not to transmit any reference symbols or (control) data and/or where the base station is allowed not to receive anything in uplink. These idle periods may be needed for adaptive HeNB downlink transmit power setting even in case the access node is moved or environment is changing, for example when a window is opened.

According to a further embodiment of the invention, scanning a neighborhood of the first base station comprises measuring a power received from the second base station.

To enable the adaptive HeNB power control method as described, for example within the idle periods, the strongest OSG (or non CSG) eNB received power received at the HeNB may be considered. CSG eNBs in the neighborhood are not considered in the power control or power setting procedure.

According to a further embodiment of the invention, the downlink transmit power of the first base station is adapted depending on a maximum allowed transmission power of the first base station and the power received from the second base station.

The downlink transmission power of HeNB may be set by HeNB according to the rule $$P_{tx} = \text{Min}(\alpha \cdot P_{wa} + \beta, P_{max})$$

wherein $P_{tx}$ is the used downlink transmission power of HeNB, $P_{max}$ is the maximum allowed transmission power and $P_{wa}$ is the power received from strongest co-channel cell with non CSG configured, which may be equal to the strongest received OSG cell. The parameter $P_{max}$, $\alpha$ and $\beta$ may be signaled by an operating and maintenance unit (OAM) or may be set by default. $P_{max}$ may be the maximum allowed HeNB transmission power, $\alpha$ may be equal to 1 and $\beta$ may be set for example to a predefined value which could be operator specific and signaled on the broadcast control channel of macro NBs. An appropriate value may be for example ~45 dBm, corresponding to typical minimum coupling loss for HeNBs scenarios.

These default values of $\alpha$ and $\beta$ may not give optimum performance, which may be signal-to-interference ratio (SINR) of about 0 dB to a UE located close to the HeNB, but can be changed (optimized) by signaling. For the monitoring of co-channel CSG cells the assumption may be that the HeNB has a UE receiver implemented to measure the strongest received non CSG cell and that there are idle periods where the HeNB is allowed not to transmit any data in downlink.

According to a further embodiment of the invention, if the received power of the second base station is below a threshold value and/or if no second base station is present within the neighborhood of the first base station, the downlink transmit power of the first base station is set to a predefined minimum value.

This may denote to allow, in case the power $P_{wa}$ is below a certain threshold or if no wide area OSG cell can be found at all, still a minimum transmit power $P_{tx}=P_{tx,min}$ independent of $P_{wa}$. The power $P_{tx,min}$ shall be then sufficiently small so that possible impact of interference on systems or devices is negligible.

According to a further embodiment of the invention, if the received power of the second base station is below a threshold value and/or if no second base station is present within the neighborhood of the first base station, further comprising copying a downlink transmit power setting of a further first base station adapted for serving a further closed subscriber group, wherein the further first base station is located within the neighborhood of the first base station.

This may denote to copy, in case the power $P_{wa}$ is below a certain threshold (or if no wide area OSG cell can be found at all), the downlink transmit power setting of a neighboring HeNB. A further embodiment may be to scan, in case the power $P_{wa}$ is below a certain threshold (or if no wide area OSG cell can be found at all), for mobile cellular signals on neighbor systems (inter RAT systems) and signal collected information to OAM which can utilize this to increase reliability of geo-location information.

According to a second aspect of the invention there is provided a first base station adapted for serving a closed subscriber group. The first base station comprises a unit for scanning the neighborhood of the first base station for a second base station adapted for serving an open subscriber group, wherein the first base station and the second base station use the same carrier frequency, a unit for detecting whether the second base station is present within the neighborhood of the first base station, and a unit for adapting the downlink transmit power of the first base station depending on the presence of the second base station.

According to a further embodiment, the first base station comprises a unit for receiving information about codes used by the second base station for communication with assigned user equipments.

HeNBs or the first base station are informed via network signaling, that means via the wired interface with which they connect to the backbone network, which S-SCH codes are utilized for CSG eNBs and therefore know implicitly which S-SCH codes are utilized for OSG. This may also be done vice versa. This may be needed if the HeNB downlink power adjustment should be done dependent on OSG wide area cell and not dependent on neighboring HeNB CSG cell since this would cause instable behavior, where neighbor HeNBs would set power lower and lower in order not to produce too much interference for example.

The HeNB may be listening to the BCCH of a wide area eNB to obtain the information about used S-SCH codes. However this may only be possible during the activation of the HeNB when it does not yet have to serve a user. During normal operation this may require extended interruptions where the HeNB is not able to transmit anything. Also signaling via the backhaul interface may be suitable.

According to a further aspect of the invention there is provided a computer-readable medium (for instance a CD, a DVD, a USB stick, a floppy disk or a hard disk), in which a computer program of adapting a downlink transmit power of a first base station adapted for serving a closed subscriber group is stored, which computer program, when being executed by a processor, is adapted to carry out or control a method for adapting a downlink transmit power of a first base station adapted for serving a closed subscriber group.

According to a further aspect of the invention there is provided a program element (for instance a software routine, in source code or in executable code) of adapting a downlink transmit power of a first base station adapted for serving a closed subscriber group, which program element, when being executed by a processor, is adapted to carry out or control a method for adapting a downlink transmit power of a first base station adapted for serving a closed subscriber group.

Adapting a downlink transmit power of a base station which may be performed according to aspects of the invention can be realized by a computer program, that is by software, or by using one or more special electronic optimization circuits, that is in hardware, or in hybrid form, that is by means of software components and hardware components.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
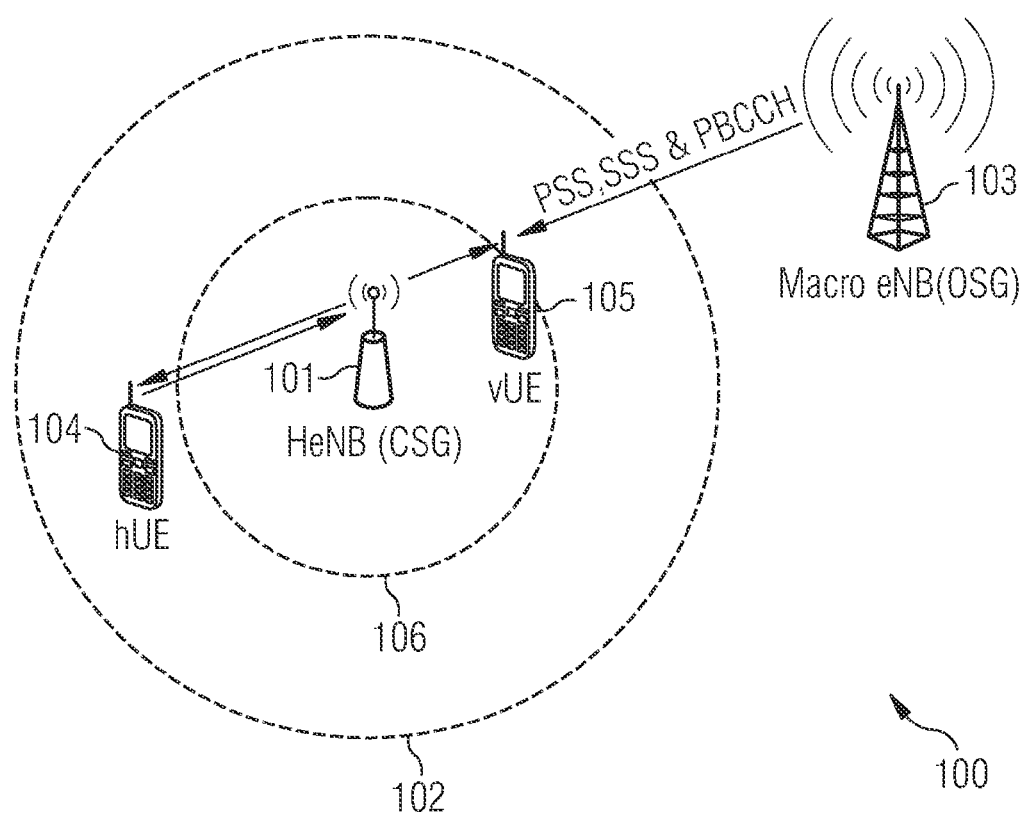
FIG. 1 shows a closed subscriber group local cell with an open subscriber group macro overlay cell.

The illustration in the drawing is schematically. It is noted that in different figures, similar or identical elements are provided with reference signs, which are different from the corresponding reference signs only within the first digit.

FIG. 1 shows a network system 100 according to the present invention. It is described a closed subscriber group local cell comprising a base station or HeNB 101 with an open subscriber group macro overlay cell comprising an Macro eNB or base station 103. The HeNB covers a coverage range 102.

A home UE (hUE) 104 with access rights to the HeNB 101 can connect to the home network without problems in the whole HeNB coverage area 102. On the other hand, a visiting UE (vUE) 105 has no access rights to the HeNB 101. If the vUE 105 is moving close to the HeNB 101 and the HeNB is active, the vUE 105 does not have a chance to decode the wide area PSS, SSS and PBCH channels needed for connecting to the macro eNB 103. Therefore it is helpful if the CSG HeNB 101 reduces its transmission power in case OSG macro eNB 103 power is small and only allow higher CSG HeNB 101 power if OSG macro eNB 103 power is quite high to avoid the probability of huge macro cell dead zones 106.

To ensure correct HeNB 101 power setting, downlink HeNB power control monitor OSG macro 103 neighborhood power setting during operation. This may be carried out with minimum changes to current LTE Rel. 8 specification by introducing idle periods (multiple OFDM symbols) where HeNB 101 do not transmit data and reference symbols in downlink. Further by only considering macro OSG cells 103 in neighborhood for power setting procedure it is avoided that neighboring HeNB increase their power step by step to compete against each other, which would be the case if also CSG neighborhood would be considered.

LTE eNBs 101 with limited access rights (CSG) like a HeNB or a pico eNB with CSG feature configured, detect or scan periodically its neighborhood for conventional (OSG) cells 103 on its own carrier frequency and measure the received power preferably on S-SCH, if S-SCH code is sufficient to uniquely identify whether it is a CSG or no CSG eNB. Otherwise also P-SCH and/or PBCH may be used. For an LTE eNB to do this periodic scanning, idle periods (DL idle sub-frames) may be used where the CSG eNB is allowed not to transmit any reference symbols or (control) data and/or where the eNB is allowed to not receive anything in uplink.

Figure 2:
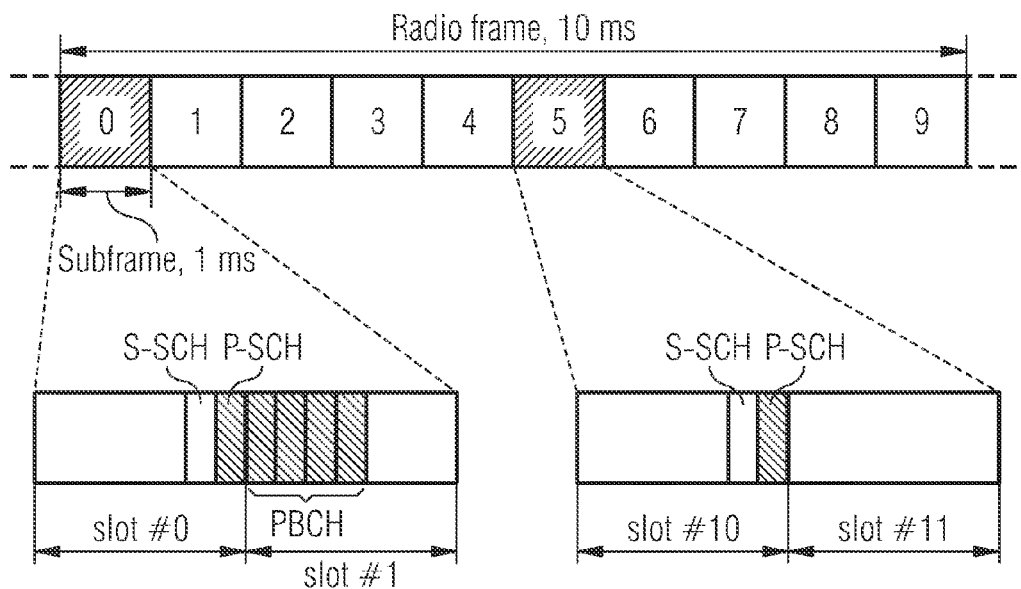
FIG. 2 shows a sub-frame structure for LTE eNodeBs.

In FIG. 2, the sub-frame structure for LTE eNB and the central 72 sub-carrier channels where PBCH, P-SCH and S-SCH transmission takes place is depicted. It can be seen that the P-SCH (Primary Synchronization Channel) and S-SCH (Secondary Synchronization Channel) is transmitted in sub-frame 0 and sub-frame 5 of each 10 ms radio frame. Further, the PBCH (Primary Broadcast Channel) is transmitted in sub-frame 0 of each 10 ms radio frame.

Figure 3:
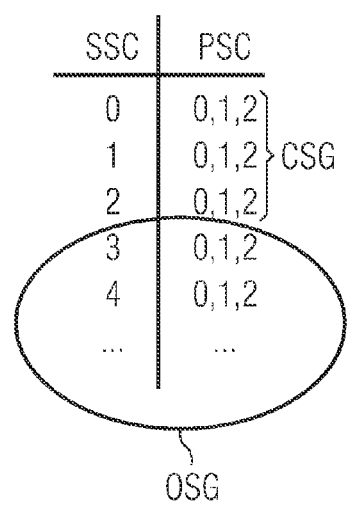
FIG. 3 shows a configuration of P-SCH and S-SCH codes.

For the OSG eNB environment scanning done in HeNBs 101, the configuration of P-SCH and S-SCH codes shall be so that some S-SCH codes are either used for OSG or CSG independent of P-SCH code. This can be seen in FIG. 3, where SSC 0, 1 and 2 denote CSG independent on PSC sequence number and SSC 3 and higher denote OSG independent on PSC sequence number.

HeNBs are informed via network signaling, that means via the wired interface with which they connect to the backbone network, which S-SCH codes are utilized for CSG eNBs and therefore know implicitly which S-SCH codes are utilized for OSG. This can also be done vice versa. This may be needed since HeNB downlink power adjustment should be done dependent on OSG wide area cell and not dependent on neighboring HeNB CSG cell since this would cause instable behavior, where neighbor HeNBs would set power lower and lower in order not to produce too much interference for example or higher and higher in order to compete against each other.

According to conventional networks, the information which cell IDs or which S-SCH codes are being used for HeNBs is only signaled to UEs, but not to a HeNB. One option might be that the HeNB is listening to the BCCH of a wide area eNB to obtain this information. However this may only be possible during the activation of the HeNB when it does not yet have to serve a user. During normal operation this would require extended interruptions where the HeNB is not able to transmit anything. Therefore a signaling via the backhaul interface may be carried out.

For OSG neighbor power measurements at HeNBs, the SSC signal may be used. This avoids the problems that would occur if PSC and SSC signal would need to be used together. In case of synchronized networks PSC from a first OSG neighbor eNB and SSC from a second OSG neighbor eNB could be mixed leading to wrong results. Especially there could be wrong understanding if a cell is of CSG or OSG type if P-SCH from the first eNB and S-SCH from the second eNB is mixed for example. In order to obtain unambiguous results in this case a measurement on the PBCCH would be required, which is more difficult to do.

After measuring the S-SCH power the HeNB 101 downlink transmit power is adapted according to a downlink power control rule as described above.

With the LTE specific periodic repetition of broadcast and synchronization channels per frame for detection of neighbor cells, the periodicity of measurements needs to be prime to the S-SCH, P-SCH and PBCCH periodicity. This may be especially needed in case eNBs have unsynchronized timing to each other, because then the HeNB may have to receive different eNBs to make sure it receives the strongest one. Relative prime means that the measurement periodicity and the periodicity of the S-CCH, which is 5 ms are not both a multiple of another periodicity, for example 2.5 ms, which is larger than the effective observation time, for example 2 ms. If a 2 ms measurement was done every 2.5 ms, then gaps of 0.5 ms would remain every 2.5 ms.

The effective observation time needs to take also into account a potential switching time and also the fact that the observation needs to cover the entire S-SCH duration. That means that the effective observation time may be shorter than the time the HeNB devotes to the entire measurement process and the transmission gaps in the own transmitted signals that are necessary to do the observations.

The HeNB will have to neglect transmission of its own signals in order to be able to measure wide area signals in the vicinity. This can be done by configuring DRX and paging cycles appropriately. Paging cycles allow a UE that is not in active mode to power down its receiver for extended periods of time in the order of a second, and DRX settings allow UEs in connected mode to also power down the receiver in the order of a few milliseconds.

While the UE is not obliged to switch off the receiver during that time, it is quite safe to assume it will in order to extend standby times. Therefore it is most safe to switch off the cell's own signals during that time. There is a small risk that a UE which is just performing the cell search will miss the HeNB because by coincidence it just was searching the S-SCH when the HeNB switched it off, but this is a small probability and the effect will be cured by the next cell selection. Therefore, as an additional requirement, the periodicity of measurement patterns at the HeNB should also be prime with the periodicity of neighbor cell search patterns (more accurately with search patterns which correspond to minimum performance requirements for cell search).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

100 network system
101 first base station, HeNB
102 coverage range of first base station
103 second base station, Macro eNB
104 home UE
105 visiting UE
106 dead zone of second base station cell

The invention claimed is:
1. A method, comprising:
scanning a neighborhood of a first base station, by the first base station, for a second base station adapted for serving an open subscriber group, wherein the first base station and the second base station use a same carrier frequency, wherein scanning a neighborhood of the first base station comprises measuring a power received from the second base station, and wherein the scanning is carried out during idle periods of the first base station, and comprises a plurality of individual scanning procedures for the second base station;
detecting whether the second base station is present within the neighborhood of the first base station; and
adapting a downlink transmit power of the first base station depending on a presence of the second base station, wherein if at least one of the received power of the second base station is below a threshold value and no second base station is present within the neighborhood of the first base station then the downlink transmit power of the first base station is set to a predefined minimum value.

2. The method as set forth in claim 1, wherein the downlink transmit power of the first base station is adapted according to predefined rules.

3. The method as set forth in claim 1, wherein the downlink transmit power of the first base station is adapted depending on a maximum allowed transmission power of the first base station and the power received from the second base station.

4. The method as set forth in claim 1, wherein if at least one of the received power of the second base station is below a threshold value and if no second base station is present within the neighborhood of the first base station, the method further comprising copying a downlink transmit power setting of a further first base station adapted for serving a further closed subscriber group, wherein the further first base station is located within the neighborhood of the first base station.

5. The method as set forth in claim 1, wherein if at least one of the received power of the second base station is below a threshold value and if no second base station is present within the neighborhood of the first base station, the method further comprising scanning for mobile cellular signals on neighbor systems to detect whether the second base station is present within the neighborhood of the first base station.

6. An apparatus, comprising:
at least one processor; and
at least one memory including computer program code, where the at least one memory and the computer program code are configured, with the at least one processor, to cause the apparatus to at least:
scan a neighborhood of a first base station, by the first base station, for a second base station adapted for serving an open subscriber group, wherein the first base station and the second base station use the same carrier frequency, wherein scanning a neighborhood of the first base station comprises measuring a power received from the second base station, and wherein the scanning is carried out during idle periods of the first base station and comprises a plurality of individual scanning procedures for the second base station;
detect whether the second base station is present within the neighborhood of the first base station; and
adapt a downlink transmit power of the first base station depending on the presence of the second base station, wherein if at least one of the received power of the second base station is below a threshold value and no second base station is present within the neighborhood of the first base station then the downlink transmit power of the first base station is set to a predefined minimum value.

7. The apparatus as set forth in claim 6, wherein the at least one memory including the computer program code is configured with the at least one processor to receive information about codes used by the second base station for communication with assigned user equipment.

8. The apparatus as set forth in claim 6, wherein the downlink transmit power of the first base station is adapted according to predefined rules.

9. The apparatus as set forth in claim 6, wherein the downlink transmit power of the first base station is adapted depending on a maximum allowed transmission power of the first base station and the power received from the second base station.

10. The apparatus as set forth in claim 6, wherein if at least one of the received power of the second base station is below a threshold value and if no second base station is present within the neighborhood of the first base station, the at least one memory including computer program code is configured with the at least one processor to cause the apparatus to copy a downlink transmit power setting of a further first base station adapted for serving a further closed subscriber group, wherein the further first base station is located within the neighborhood of the first base station.

11. A non-transitory computer-readable medium, in which a computer program of adapting a downlink transmit power of a first base station adapted for serving a closed subscriber group is stored, which computer program, when being executed by a processor, is adapted to carry out or control the method according to claim 1.

12. A non-transitory computer-readable medium including a program element of adapting a downlink transmit power of a first base station adapted for serving a closed subscriber group, which program element, when being executed by a processor, is adapted to carry out or control a method according to claim 1.

13. A non-transitory computer-readable medium including computer program code, the computer program code executed by a processor to perform at least:

scanning a neighborhood of a first base station, by the first base station, for a second base station adapted for serving an open subscriber group, wherein the first base station and the second base station use a same carrier frequency, wherein scanning a neighborhood of the first base station comprises measuring a power received from the second base station, and wherein the scanning is carried out during idle periods of the first base station, and comprises a plurality of individual scanning procedures for the second base station;

detecting whether the second base station is present within the neighborhood of the first base station; and adapting a downlink transmit power of the first base station depending on a presence of the second base station, wherein if at least one of the received power of the second base station is below a threshold value and no second base station is present within the neighborhood of the first base station then the downlink transmit power of the first base station is set to a predefined minimum value.

14. The non-transitory computer-readable medium as set forth in claim 13, wherein the downlink transmit power of the first base station is adapted according to predefined rules.

15. The non-transitory computer-readable medium as set forth in claim 13, wherein the downlink transmit power of the first base-station is adapted depending on a maximum allowed transmission power of the first base station and the power received from the second base station.

16. The non-transitory computer-readable medium as set forth in claim 13, wherein if at least one of the received power of the second base station is below a threshold value and if no second base station is present within the neighborhood of the first base station, performing copying a downlink transmit power setting of a further first base station adapted for serving a further closed subscriber group, wherein the further first base station is located within the neighborhood of the first base station.

17. The non-transitory computer-readable medium as set forth in claim 13, comprising receiving information about codes used by the second base station for communication with assigned user equipment.

* * * * *